United States Patent [19]
Wiesler

[11] Patent Number: 6,127,752
[45] Date of Patent: Oct. 3, 2000

[54] MOTOR WITH RPM PICKUP VIA A HALL SENSOR

[75] Inventor: Martin Wiesler, Baden-Baden, Germany

[73] Assignee: Robert Bosch GmbH, Stuttgart, Germany

[21] Appl. No.: 09/155,847

[22] PCT Filed: Feb. 12, 1998

[86] PCT No.: PCT/DE98/00393

§ 371 Date: Oct. 7, 1998

§ 102(e) Date: Oct. 7, 1998

[87] PCT Pub. No.: WO98/40751

PCT Pub. Date: Sep. 17, 1998

[30] Foreign Application Priority Data

Mar. 12, 1997 [DE] Germany .......................... 197 10 015

[51] Int. Cl.⁷ .................................................. H02K 11/00
[52] U.S. Cl. .......................... 310/68 B; 310/71; 310/238; 310/239; 310/DIG. 3; 310/DIG. 6
[58] Field of Search ........................... 310/68 B, DIG. 3, 310/DIG. 6, 238, 239, 71

[56] References Cited

U.S. PATENT DOCUMENTS

| | | | |
|---|---|---|---|
| 4,614,886 | 9/1986 | Schneider et al. ........................ | 310/83 |
| 4,847,528 | 7/1989 | Eguchi et al. ........................... | 310/239 |
| 5,086,243 | 2/1992 | Hofmann ............................... | 310/68 B |
| 5,184,039 | 2/1993 | Kraft ..................................... | 310/89 |
| 5,319,277 | 6/1994 | Materne et al. ........................ | 310/239 |
| 5,382,857 | 1/1995 | Schellhorn et al. ..................... | 310/83 |
| 5,444,315 | 8/1995 | Adam et al. ............................ | 310/42 |
| 5,528,093 | 6/1996 | Adam et al. ............................ | 310/89 |
| 5,565,721 | 10/1996 | Knappe ................................. | 310/68 B |
| 5,668,422 | 9/1997 | Deynet .................................. | 310/71 |
| 5,747,911 | 5/1998 | Kikly .................................... | 310/239 |

*Primary Examiner*—Nestor Ramirez
*Assistant Examiner*—Burt Mullins
*Attorney, Agent, or Firm*—Ronald E. Greigg; Edwin E. Greigg

[57] ABSTRACT

The invention is based on an electrically operated motor, having a shaft with a magnet rotor body, the RPM of the shaft can be picked up by a Hall sensor disposed on a circuit board. The circuit board is embodied with soldered pins or contact shoes and is integrated into a component of the motor, and that contacts, supply and signal lines for the circuit board are injected and/or plugged into the component of the motor.

42 Claims, 5 Drawing Sheets

MOTOR WITH RPM PICKUP VIA A HALL SENSOR

PRIOR ART

The invention is based on a motor in which signals from a shaft are picked up by means of a Hall sensor, One such motor is known from German Patent Disclosure DE 43 26 391 A1. The motor is a direct current motor with a commutator, and it has a motor housing and a rotor with a rotor shaft, the rotor being drivable in two rotational directions. The rotor shaft is supported in two bearing end plates that close off the motor housing on two sides. A two-pole magnet rotor body is fixedly mounted on the rotor shaft. A Hall sensor is disposed on a circuit board embodied as an assembly component, which is plugged from outside into a recess of the bearing end plate. The recess has a bottom face that has a closed, indented chamber. The chamber protrudes from the inside of the bearing end plate and has a chamber wall facing the magnet rotor body. The Hall sensor is disposed behind the chamber wall at the level of the magnet rotor body and senses signals of the magnet rotor body. On the front side of the circuit board, pointing toward the magnet rotor body, electrical components are provided, such as a Hall sensor, resistor, etc. In the region of their terminal ends, power supply lines and signal lines of the electrical components are guided from the front side to the back side of the circuit board through recesses of the circuit board; the stripped terminal ends are inserted through through openings from the front side to the back side of the circuit board so as to be contacted with conductor tracks on the back side. The power supply lines and signal lines are guided through an insulating sleeving and are connected to a push-on sleeve housing that forms an assembly unit with the circuit board.

Because of the additional chamber that protrudes from the inner edge of the bearing end plate, greater installation space is needed. A bearing end plate with such a chamber and the resultant dimensions is suitably used only in motors with a Hall sensor. The magnet rotor body is spaced far apart from the Hall sensor, being disposed behind the chamber wall. This dictates a large installation space. Moreover, the magnet must be designed with greater strength, so that over the great distance and through the chamber wall it can pick up the signals. A stronger magnet increases the installation space and the weight, so that the magnet has a greater effect on the shaft rotation, and increased energy is required for driving. Because power supply lines and signal lines are passed through an insulating sleeving and are guided with traction relief in recesses, greater assembly effort and expense are required on the one hand, and on the other the weight and costs rise because of the many individual parts in the installation space.

The motor is used in particular in motor vehicles as a drive motor for raising windows, actuating a sunroof, adjusting seats and mirrors, and so forth. Especially in these applications, there is a need for a small, lightweight construction.

ADVANTAGES OF THE INVENTION

The motor of the invention has the advantage that because of the injected and/or plugged-in soldered pins or contact shoes, the circuit board can be made very small and embodied economically, so that it can be integrated into an existing component of the motor, which is needed even without Hall sensors, and thus requires no additional installation space. The term "integrated" is understood in this connection to mean that the circuit board is inserted into a component, for instance being plugged into it, in such a way that the external dimensions of the component are not increased, or in other words that an existing available space is utilized. If contacts, power supply lines and signal lines for the circuit board are injected and/or plugged into the component, then again installation space is saved, so that as a result again no additional installation space is needed. The contacts and the lines can all be injected, or all encapsulated, or inserted in combined fashion in the component. If the parts are plugged in, production can be made more economical. The parts can be dispensed with if a motor without a Hall sensor is being produced. Injection, on the other hand, is slightly more expensive, but it reduces and simplifies the effort of assembly, and the parts are optimally fixed in the component of the motor. The form selected will depend in each case on the application. The possibility of modular construction, that is, that the parts can be used both for a motor with a Hall sensor and a motor without a Hall sensor, exists in both cases, however.

Advantageous further features of the motor are possible by means set forth hereinafter.

If a plug to which the power supply lines and signal lines of the circuit board lead is formed onto the component, then additional components—such as a plug-in sleeve housing, components for traction relief, and so forth—can be dispensed with, assembly expense can be reduced, and costs can thus be saved. It is favorable if the plug fits commercially available, conventional terminal plugs.

If the component is a brush holder of the motor, in which the circuit board is integrated with the Hall sensor and the contacts, power supply lines and signal lines are plugged in or injected, then the component from the outset has a plug with power contacts for the motor, especially for brushes of the motor, and this plug can be used at the same time for the circuit board, so that a plug required anyway is used for a further task, thus eliminating significant additional production and assembly expense.

If the bearing cap and brush holder are formed in one piece, there is economy of one injection-molded part and thus of installation space, production and assembly effort, and cost, especially because only one mold for one injection-molded part is needed. If a brush holder that at the same time forms the bearing cap is thrust onto the motor shaft, the problem arises that an auxiliary cone, which is needed to push the brushes apart on this insertion, can no longer be pulled away from the shaft, since the integrated bearing cap prevents this. This problem is either solved with special holding devices or advantageously with a part that has no function after installation in the motor housing. If the magnet rotor body is now disposed between the bearing and the commutator, upstream of the brushes, and has a chamfer that acts as a thrust cone, then this additional part can be dispensed with. Thus, the magnet rotor body serves to push the brushes apart and at the same time serves as a signal transducer for the Hall sensor. There is no increase in the number of components. If the magnet rotor body is located upstream of the brushes and immediately downstream of a bearing in the bearing cap, then it is assigned still a third function, of supporting the shaft in the axial direction with its face end, as long as a gear is not yet connected to the motor.

If the magnet rotor body is the same size as a thrust cone that is used without a Hall sensor, then the installation space remains the same size, and the increase in weight is negligible.

If the Hall sensor is seated directly near by or adjacent to the magnet rotor body, that is, with the least possible spacing from it and without any partition between the magnet rotor body and the hall sensor, the signals can be better received, intrinsically less space is needed, and the magnet can be weaker. This makes it smaller, lighter in weight and less expensive.

Because the Hall sensor is oriented parallel to the shaft axis, axial motions of the shaft can be compensated for, since the signals in the axial direction, because of the width of the magnet, can be received in virtually the same intensity over a greater range.

According to the invention, the Hall sensor, which is a Hall IC, is mounted on the circuit board by an SMD process. The SMD process is a surface melting process, by which the Hall sensor rests flat on the circuit board, in contrast to the conventional process in which the sensor stands on contact feet. The overall structure can thus be flatter, and the Hall sensor and in particular the contacts of the Hall sensor with which it is mounted on the circuit board are less vulnerable to destruction or shifting in position, since there are no longer such legs that could crumple, for instance. Because of the flat construction, existing flat interstices can be utilized for the disposition of the circuit board.

The magnet rotor body has a two-pole magnet, for instance based on neodymium-iron-boron, with some plastic. Because of the neodymium material, the same effect can be achieved with much smaller dimensions than in conventional ferrite magnets. The magnet rotor body becomes smaller and lighter in weight and thus produces a lesser flywheel effect.

The magnet rotor body comprises a carrier of plastic, on which the magnet is sprayed. The magnet rotor body is fixed on the shaft with a press fit. This makes assembly easier. Moreover, no adhesive is needed for fixing the magnet rotor body. Adhesives as a rule represent a complicated, inconvenient operation, especially in automated sequences. Furthermore, the press fit can be selected such that it absorbs the requisite tangential and axial forces, yet the magnet rotor body if it becomes worn, for instance, can be pulled off again easily. Plastic means that an intrinsically brittle magnet can be secured with a press fit, since soft plastic absorbs the strains generated by the press fit operation. This prevents the magnet from rupturing in response to mechanical strains. This is preferably achieved with a bore in the plastic carrier that widens downstream of a cylindrical portion.

The plastic is press-fitted on with increased tension, so that at all operating temperatures the tension in the plastic suffices to create the requisite adhesion force on the shaft and thus to fix the magnet rotor body.

BRIEF DESCRIPTION OF THE DRAWINGS

Exemplary embodiments of the invention are shown in the drawing. In the description and the claims, numerous characteristics are shown and described in combination. One skilled in the art will also expediently consider the characteristics individually and combine them into further useful combinations.

Shown are.

DESCRIPTION OF THE EXEMPLARY EMBODIMENTS

Figure 1:
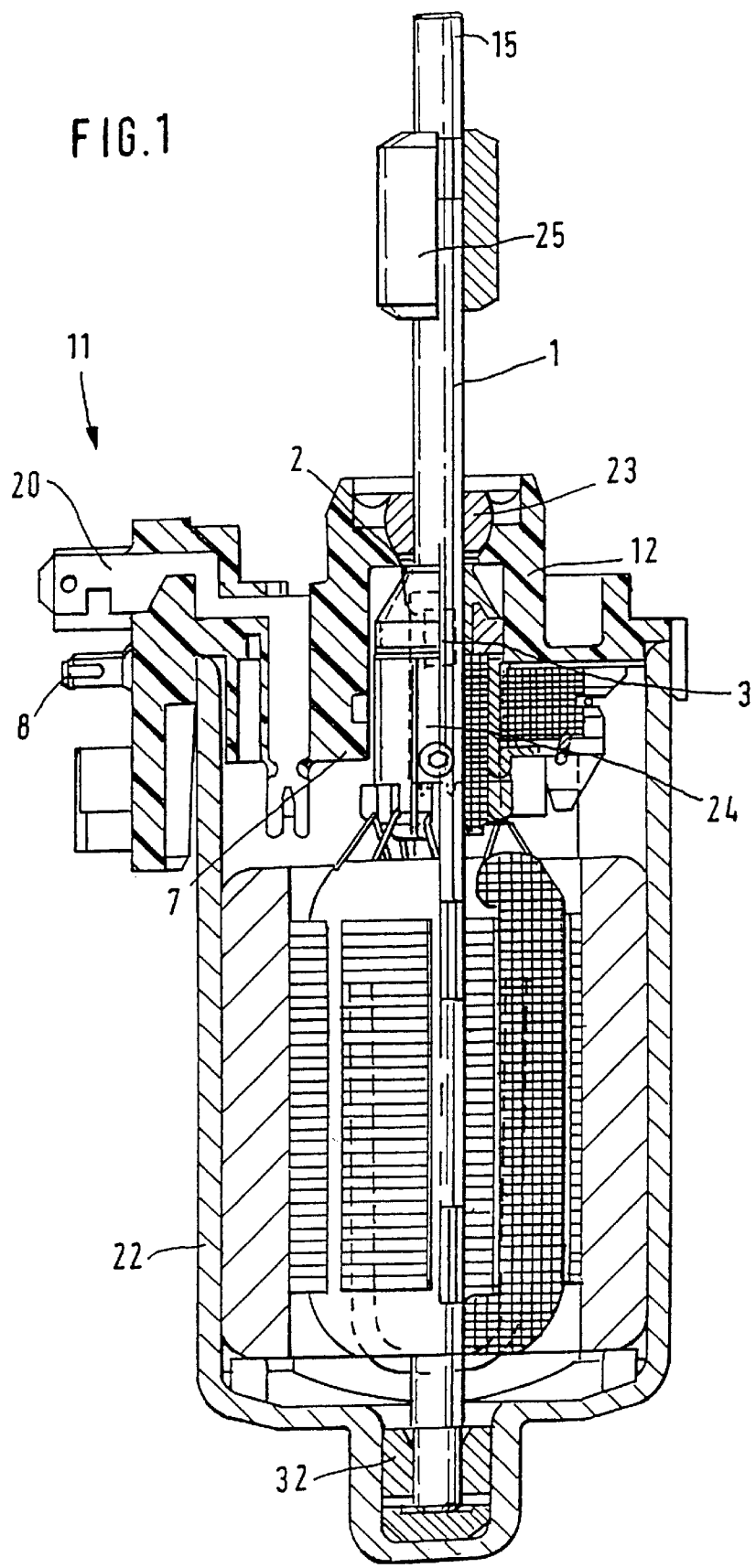
FIG. 1, a section through a motor.

In FIG. 1, by way of example, a direct current motor with a commutator 24 is shown. The invention applies equally to alternating current and rotary current motors, but direct current motors are especially suitable for use as window raisers, sunroof actuators, seat adjusters, mirror adjusters, etc.

The motor has a shaft 1, which is supported in a motor housing 22 in bearings 23, 32. It has a gear wheel 25, by way of which a mechanism, not shown, is driven. The motor housing 22 is closed on one end and is open on one end for installation of the internal parts of the motor. The open end is closed by a bearing cap 12, which at the same time forms a brush holder 7. A bearing 23, preferably a cup-shaped bearing, is located in the bearing cap 12.

A magnet rotor body 2 is supported on the shaft 1 with a press fit 18, between the commutator 24 and the bearing 23. The shaft 1 is axially supported on the bearing 23 by the face end 21 of the magnet rotor body 2, as long as no mechanism is yet connected to the gear wheel 25. A magnet 16 with two or more poles is disposed on the magnet rotor body 2; in one revolution, referred to a point on the circumference, it generates two magnet pulses. These pulses are picked up by a Hall sensor 3, which is disposed with slight play from the magnet 16.

Figure 2:
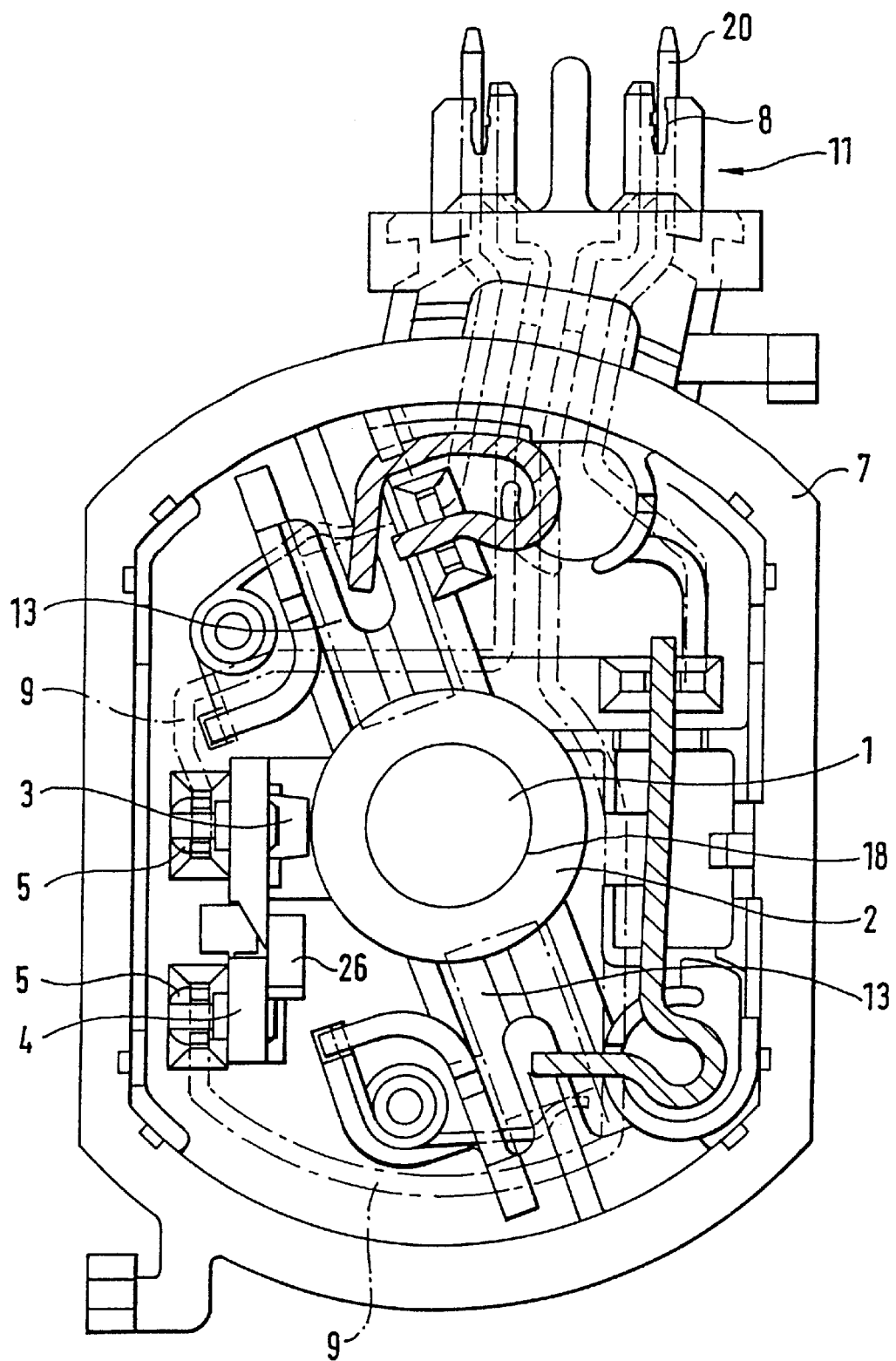
FIG. 2, a view of a brush holder with a Hall sensor.
Figure 3:
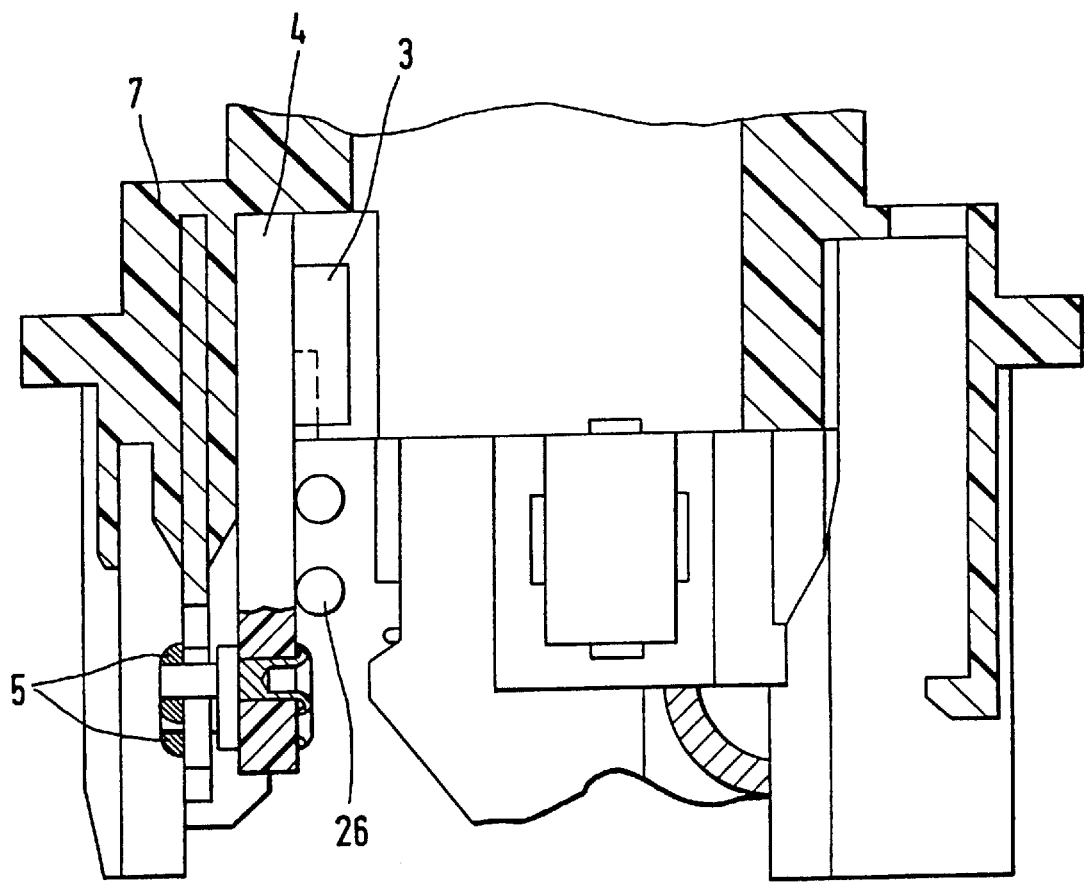
FIG. 3, a section through a brush holder with a Hall sensor, contacted with soldered pins, FIG. 4, a section through a brush holder with a Hall sensor, contacted with contact shoes, FIG. 5, a magnet rotor body.

FIGS. 2 and 3 show the brush holder 7, in which a circuit board 4 is integrated on which the Hall sensor 3 is disposed. A plug 11 is formed onto the brush holder 7 or bearing cap 12. The plug has power contacts 20, through which the motor or its brushes 13 is supplied with current. The plug 11 also has contacts 8, with which the circuit board 4 is connected by means of power supply lines and signal lines 9 and soldered pins 5 or contact shoes 6. The power supply lines and signal lines 9 are encapsulated in or plugged into the brush holder 7.

Figure 4:
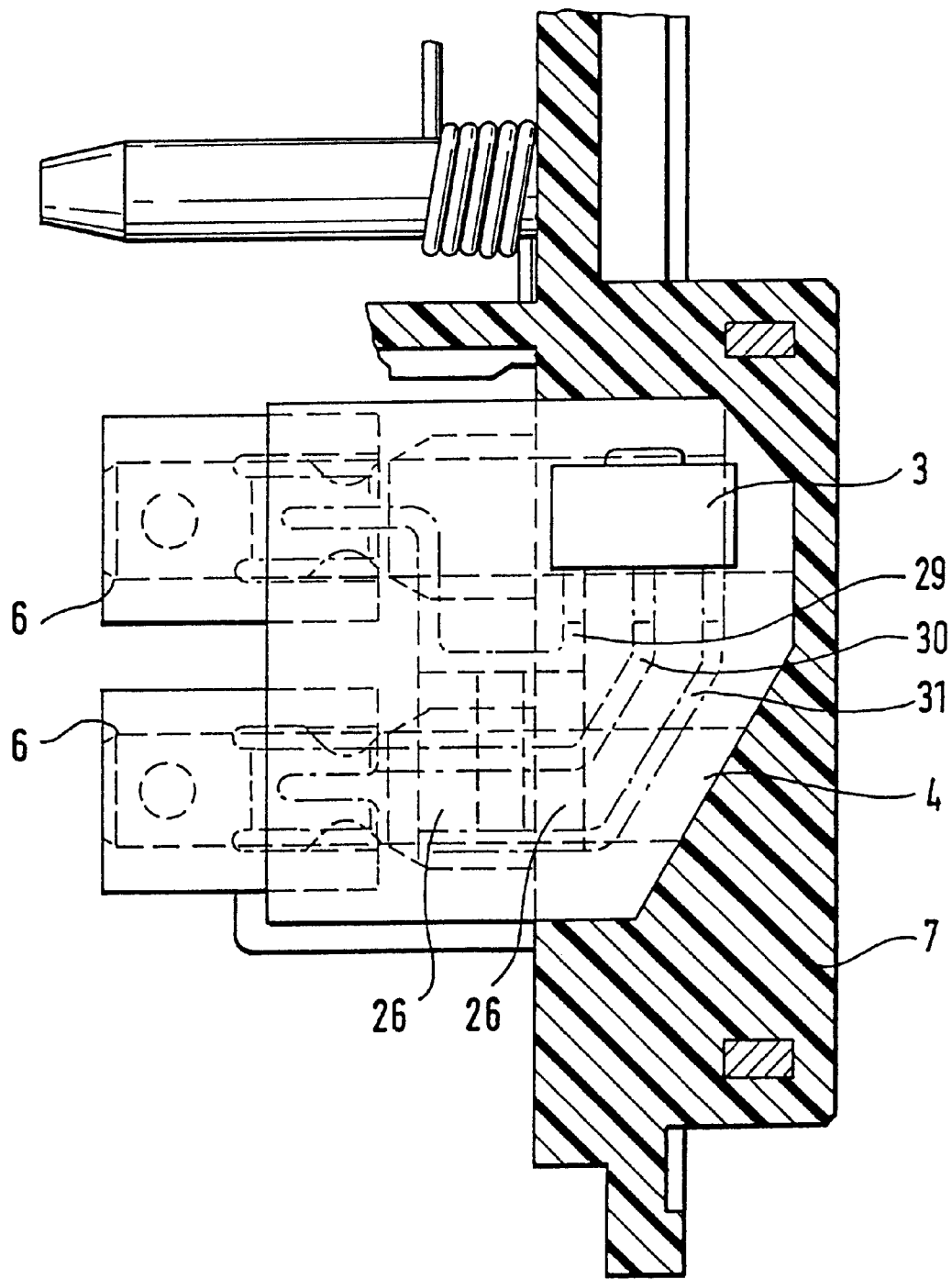

FIG. 4 shows that the Hall sensor 3 has terminals that are connected to three conductor tracks 29, 30, 31. The conductor track 29 leads from contact shoe 6 to the Hall sensor 3 and is connected to the conductor track 31 via two parallel-connected resistors 26. The conductor track 30 leads from the Hall sensor 4 under the resistors 26 to the second contact shoe 6. If the shaft 1 is in rotation, then signals caused by the Hall effect are detected by the Hall sensor 3. These signals are evaluated by a control unit, not shown, connected to the plug 11. The control unit records the entering signals per unit of time, thereby determining the RPM of the shaft 1. The control unit also detects how the motor is connected, and from that determines the direction of rotation of the motor. Thus both the RPM and direction of rotation are detected, of which the direction of rotation is significant, especially in window raisers, to allow the window to be closed and opened in a defined way. Hindrances can also be detected from fluctuations in RPM, thus providing protection against fingers or hands becoming caught.

Figure 5:
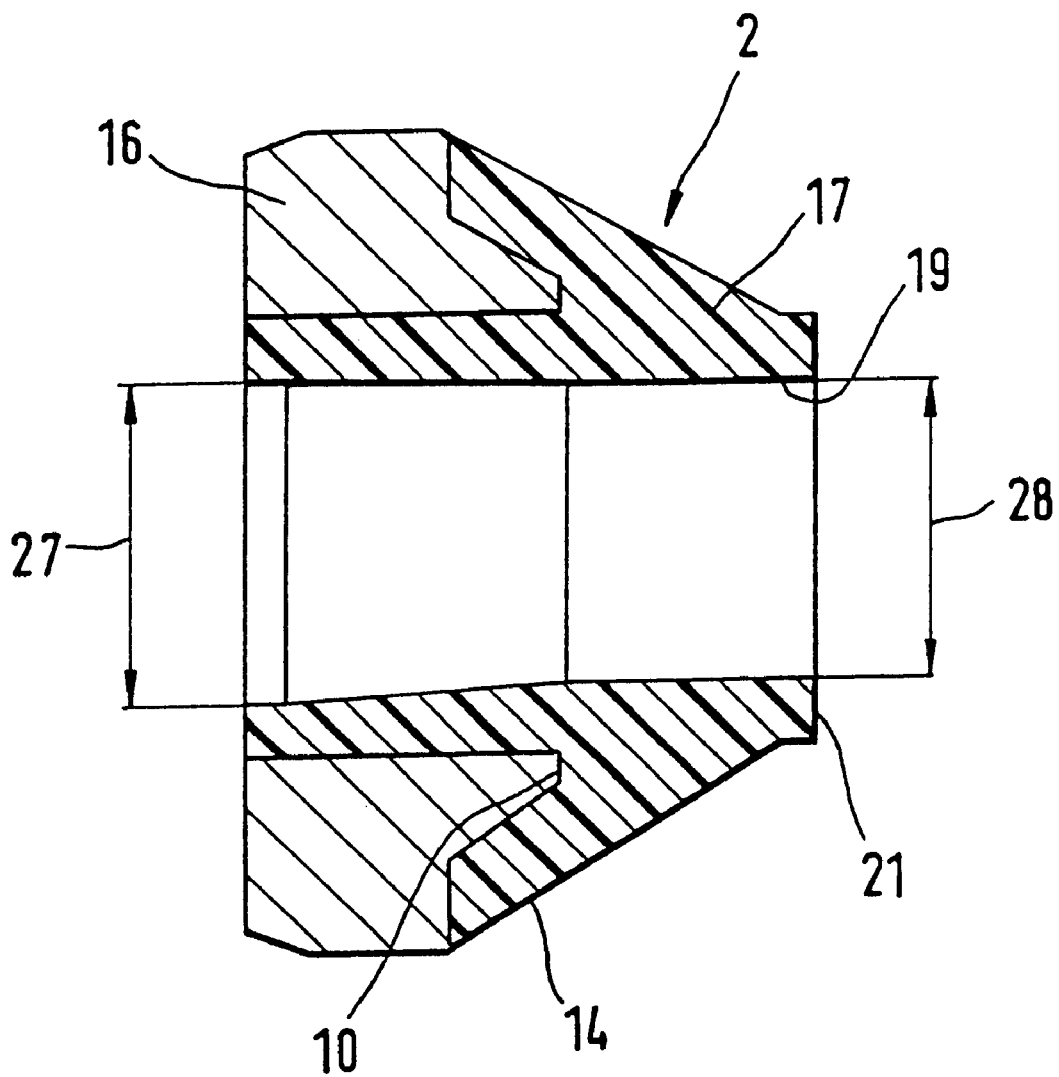

In FIG. 5, the magnet rotor body 2 is shown in section. It comprises a carrier 17, which is formed of plastic and has a chamfer 14 on one side, which is closed off with a face end 21, and a wedgelike recess 14 on the other side. A two-pole magnet 16 is sprayed onto the carrier 17, on the side of the wedgelike recess 14. The wedgelike recess 14 effects a good connection between the magnet 16 and the carrier 17. The carrier 17 has an internal bore 19, which widens conically downstream of a cylindrical part, so that the internal bore has at least two diameters 27, 28. The diameter 27 toward the magnet 16 is greater than the magnet 28 on the other side.

The foregoing relates to a preferred exemplary embodiment of the invention, it being understood that other variants and embodiments thereof are possible within the spirit and scope of the invention, the latter being defined by the appended claims.

What is claimed is:

1. An electrically operated motor, comprising a rotatable shaft (1) with a magnet rotor body (2), the RPM of said shaft is detected by a Hall sensor (3) disposed on a circuit board (4), the circuit board (4) is embodied with soldered pins (5) which are disposed on the circuit board (4) and are integrated into a brush holder (7) of the motor, and contacts (8), power supply lines and signal lines (9) for the circuit board (1) are fixed by at least one fastening injection and plugged into the brush holder (7) of the motor.

2. The motor of claim 1, in which the brush holder (7) and a bearing cap (12) are one piece.

3. The motor of claim 1, in which the power supply lines and signal lines (9) of the circuit board (4) terminate in a plug (11), which is molded onto the brush holder (7) of the motor.

4. The motor of claim 3, in which the brush holder (7) and a bearing cap (12) are one piece.

5. The motor of claim 3, in which the Hall sensor (3) is disposed with slight play in a radial direction relative to the magnet rotor body (2).

6. The motor of claim 3, in which the Hall sensor (3) is oriented parallel to an axis (15) to the shaft.

7. The motor of claim 3, in which the Hall sensor (3) is mounted on the circuit board (4) by a surface mounting device.

8. The motor of claim 3, in which the magnet rotor body (2) includes a magnet (16) containing neodymium.

9. The motor of claim 3, in which the magnet rotor body (2) includes a plastic carrier (17) with a ring magnet (16) sprayed onto the plastic carrier.

10. The motor of claim 3, in which the magnet rotor body (2) is fixed on the shaft (1) by a press fit (18).

11. The motor of claim 3, in which the magnet rotor body (2) is disposed upstream and in which the magnet rotor body (2) is disposed between a bearing (23) of the rotatable shaft (1) and the brushes (13) of the brush holder (7) and has a chamfer (14) which is used as a thrust cone for the brushes.

12. The motor of claim 1, in which the magnet rotor body (2) is disposed upstream and in which the magnet rotor body (2) is disposed between a bearing (23) of the rotatable shaft (1) and the brushes (13) of the brush holder (7) and has a chamfer (14) used as a thrust cone for the brushes.

13. The motor of claim 1, in which the Hall sensor (3) is disposed with slight play in a radial direction relative to the magnet rotor body (2).

14. The motor of claim 1, in which the Hall sensor (3) is oriented parallel to an axis (15) of the shaft.

15. The motor of claim 1, in which the Hall sensor (3) is mounted on the circuit board (4) by a surface mounting device process.

16. The motor of claim 1, in which the magnet rotor body (2) includes a magnet (16) containing neodymium.

17. The motor of claim 1, in which the magnet rotor body (2) includes a plastic carrier (17) with a ring magnet (16) sprayed onto the plastic carrier.

18. The motor of claim 1, in which the magnet rotor body (2) is fixed on the shaft (1) by a press fit (18).

19. The motor of claim 18, in which only the plastic carrier (17) has a press fit.

20. The motor of claim 19, in which the plastic carrier (17) has an internal bore (19) which widens conically so that the internal bore has at least two diameters (27, 28) and the magnet (16) is disposed on the plastic carrier (17) on one side, in which a first diameter (27) is larger than a second diameter (28) on a face end side (21).

21. The motor of claim 20, in which a tension of the press fit (18) of the plastic carrier (17) to the shaft (1) is great enough so that the carrier is not lifted by fluctuations in an operating temperature.

22. The motor of claim 20, in which a tension of the press fit (18) of the plastic carrier 17 to the shaft (1) is great enough so that the carrier is not lifted by fluctuations in an operating temperature.

23. An electrically operated motor, comprising a rotatable shaft (1) with a magnet rotor body (2), the RPM of said shaft is detected by a Hall sensor (3) disposed on a circuit board (4), the circuit board (4) is embodied with contact shoes (6) which are disposed on the circuit board and are integrated into a brush holder (7) of the motor, and contacts (8), supply lines and signal lines (9) for the circuit board (1) are fixed by at least one fastening injection and plugged into the brush holder (7) of the motor.

24. The motor of claim 23, in which the brush holder (7) and a bearing cap (12) are one piece.

25. The motor of claim 23, in which the magnet rotor body (2) is disposed upstream and in which the magnet rotor body (2) is disposed between a bearing (23) of the rotatable shaft (1) and the brushes (13) of the brush holder (7) and has a chamfer (14) used as a thrust cone for the brushes.

26. The motor of claim 23, in which the Hall sensor (3) is disposed with slight play in a radial direction relative to the magnet rotor body (2).

27. The motor of claim 23, in which the Hall sensor (3) is oriented parallel to an axis (15) of the shaft.

28. The motor of claim 23, in which the Hall sensor (3) is mounted on the circuit board (4) by a surface mounted device.

29. The motor of claim 23, in which the magnet rotor body (2) includes a magnet (16) containing neodymium.

30. The motor of claim 23, in which the magnet rotor body (2) includes a plastic carrier (17) with a ring magnet (16) sprayed onto the plastic carrier.

31. The motor of claim 23, in which the magnet rotor body (2) is fixed on the shaft (1) by a press fit (18).

32. The motor of claim 31, in which only the plastic carrier (17) has a press fit.

33. The motor of claim 32, in which the plastic carrier (17) has an internal bore (19) which widens conically so that the internal bore has at least two diameters (27, 28) and the magnet (16) is disposed on the plastic carrier (17) on one side, in which a first diameter (27) is larger than a second diameter (28) on a face end side (21).

34. The motor of claim 23, in which the power supply and signal lines (9) of the circuit board (4) terminate in a plug (11), which is molded onto the brush holder (7) of the motor.

35. The motor of claim 34, in which the brush holder (7) and a bearing cap (12) are one piece.

36. The motor of claim 34, in which the magnet rotor body (2) is disposed upstream and in which the magnet rotor body (2) is disposed between a bearing (23) of the rotatable shaft (1) and the brushes (13) of the brush holder (7) and has a chamfer (14) which is used as a thrust cone for the brushes.

37. The motor of claim 34, in which the Hall sensor (3) is disposed with slight play in a radial direction relative to the magnet rotor body (2).

38. The motor of claim 34, in which the Hall sensor (3) is oriented parallel to an axis (15) of the shaft.

39. The motor of claim 34, in which the Hall sensor (3) is mounted on the circuit board (4) by a surface mounted device.

40. The motor of claim 34, in which the magnet rotor body (2) includes a magnet (16) containing neodymium.

41. The motor of claim 34, in which the magnet rotor body (2) includes a plastic carrier (17) with a ring magnet (16) sprayed onto the plastic carrier.

42. The motor of claim 34, in which the magnet rotor body (2) is fixed on the shaft (1) by a press fit (18).

* * * * *